United States Patent
Li et al.

(10) Patent No.: US 12,368,624 B2
(45) Date of Patent: Jul. 22, 2025

(54) METHODS AND APPARATUS FOR RANDOM ACCESS IN MULTI-CARRIER COMMUNICATION SYSTEMS

(71) Applicant: Neo Wireless LLC, Wayne, PA (US)

(72) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: Neo Wireless LLC, Wayne, PA (US)

( * ) Notice: Subject to any disclaimer, the term of this patent is extended or adjusted under 35 U.S.C. 154(b) by 511 days.

(21) Appl. No.: 17/985,074

(22) Filed: Nov. 10, 2022

(65) Prior Publication Data

US 2023/0146857 A1    May 11, 2023

Related U.S. Application Data

(63) Continuation of application No. 17/678,562, filed on Feb. 23, 2022, now Pat. No. 11,502,888, which is a continuation of application No. 16/544,201, filed on Aug. 19, 2019, now Pat. No. 11,324,049, which is a continuation of application No. 15/425,735, filed on Feb. 6, 2017, now Pat. No. 10,390,369, which is a continuation of application No. 13/899,226, filed on
(Continued)

(51) Int. Cl.
| | |
|---|---|
| *H04W 74/0833* | (2024.01) |
| *H04L 27/26* | (2006.01) |
| *H04L 5/00* | (2006.01) |
| *H04W 52/50* | (2009.01) |
| *H04W 74/08* | (2009.01) |

(52) U.S. Cl.
CPC ..... *H04L 27/2613* (2013.01); *H04W 74/0833* (2013.01); *H04L 5/0044* (2013.01); *H04W 52/50* (2013.01); *H04W 74/08* (2013.01)

(58) Field of Classification Search
CPC ............. H04L 27/2613; H04L 5/0044; H04W 74/0833; H04W 52/50; H04W 74/08
See application file for complete search history.

(56) References Cited

U.S. PATENT DOCUMENTS

| | | |
|---|---|---|
| 3,488,445 A | 1/1970 | Chang |
| 4,977,593 A | 12/1990 | Ballance |
| (Continued) | | |

FOREIGN PATENT DOCUMENTS

| | | |
|---|---|---|
| EP | 1021012 | 7/2000 |
| EP | 1276288 | 1/2003 |
| (Continued) | | |

OTHER PUBLICATIONS

IN RE NEO Wireless, LLC Patent Litig., Plaintiff Neo Wireless, LLC's Opening Claim Construction Brief, U.S. District Court for the Eastern District of Michigan, Southern Division, 2:22-MD-03034-TGB (Feb. 16, 2023).
(Continued)

*Primary Examiner* — Siren Wei
(74) *Attorney, Agent, or Firm* — Volpe Koenig

(57) ABSTRACT

Methods and apparatus in a multi-carrier cellular wireless network with random access improve receiving reliability and reduce interference of uplink signals of a random access, while improving the detection performance of a base station receiver by employing specifically configured ranging signals.

20 Claims, 8 Drawing Sheets

Related U.S. Application Data

May 21, 2013, now Pat. No. 9,565,700, which is a continuation of application No. 13/205,579, filed on Aug. 8, 2011, now Pat. No. 8,467,366, which is a continuation of application No. 10/583,158, filed as application No. PCT/US2005/008169 on Mar. 9, 2005, now Pat. No. 7,995,967.

(60) Provisional application No. 60/551,589, filed on Mar. 9, 2004.

(56) References Cited

U.S. PATENT DOCUMENTS

| | | |
|---|---|---|
| 5,598,154 A | 1/1997 | Wilson et al. |
| 5,726,978 A | 3/1998 | Frodigh et al. |
| 5,732,113 A | 3/1998 | Schmidl et al. |
| 5,898,338 A | 4/1999 | Proctor et al. |
| 5,903,614 A | 5/1999 | Suzuki et al. |
| 5,909,436 A | 6/1999 | Engstrom et al. |
| 5,929,704 A | 7/1999 | Proctor, Jr. et al. |
| 5,991,308 A | 11/1999 | Fuhrmann et al. |
| 6,078,216 A | 6/2000 | Proctor, Jr. |
| 6,091,702 A | 7/2000 | Saiki |
| 6,101,179 A | 8/2000 | Soliman |
| 6,144,711 A | 11/2000 | Raleigh et al. |
| 6,163,533 A | 12/2000 | Esmailzadeh |
| 6,381,229 B1 | 4/2002 | Narvinger |
| 6,421,334 B1 | 7/2002 | Baines |
| 6,442,220 B1 | 8/2002 | Sihlbom |
| 6,486,831 B1 | 11/2002 | Martorana et al. |
| 6,519,291 B1 | 2/2003 | Dagdeviren et al. |
| 6,519,449 B1 | 2/2003 | Zhang et al. |
| 6,535,547 B1 | 3/2003 | Lyckegard et al. |
| 6,539,320 B1 | 3/2003 | Szajnowski et al. |
| 6,556,557 B1 | 4/2003 | Cimini, Jr. et al. |
| 6,567,482 B1 | 5/2003 | Popovic |
| 6,600,772 B1 | 7/2003 | Zeira et al. |
| 6,628,697 B1 | 9/2003 | Douglas et al. |
| 6,738,443 B1 | 5/2004 | Bohnke et al. |
| 6,768,714 B1 | 7/2004 | Heinonen et al. |
| 6,801,782 B2 | 10/2004 | McCrady et al. |
| 6,839,876 B1 | 1/2005 | Tong et al. |
| 6,850,481 B2 | 2/2005 | Wu et al. |
| 6,928,084 B2 | 8/2005 | Cimini, Jr. et al. |
| 6,947,748 B2 | 9/2005 | Li et al. |
| 7,069,577 B2 | 6/2006 | Geile et al. |
| 7,088,782 B2 | 8/2006 | Mody et al. |
| 7,099,269 B2 | 8/2006 | Van Nee |
| 7,145,955 B1 | 12/2006 | Bohnke et al. |
| 7,177,266 B2 | 2/2007 | Sudo |
| 7,254,196 B2 | 8/2007 | Kriedte et al. |
| 7,263,058 B2 | 8/2007 | Joo |
| 7,295,518 B1 | 11/2007 | Monk et al. |
| 7,301,985 B1 | 11/2007 | Hall et al. |
| 7,310,303 B2 | 12/2007 | Koo et al. |
| 7,336,953 B2 | 2/2008 | Kim et al. |
| 7,363,038 B2 | 4/2008 | Kim et al. |
| 7,369,853 B2 | 5/2008 | Son et al. |
| 7,415,080 B2 | 8/2008 | Echavarri et al. |
| 7,426,232 B2 | 9/2008 | Matsuoka et al. |
| 7,450,489 B2 | 11/2008 | Sandhu |
| 7,483,367 B2 | 1/2009 | Chayat et al. |
| 7,551,546 B2 | 6/2009 | Ma et al. |
| 7,602,696 B2 | 10/2009 | Rhodes |
| 7,639,600 B1 | 12/2009 | Lou et al. |
| 7,675,841 B2 | 3/2010 | Suh et al. |
| 7,738,437 B2 | 6/2010 | Ma et al. |
| 7,787,431 B2 | 8/2010 | Li et al. |
| 7,787,514 B2 | 8/2010 | Shattil |
| 7,817,707 B2 | 10/2010 | Sohn et al. |
| 7,986,742 B2 | 7/2011 | Ketchum et al. |
| 7,995,967 B2 | 8/2011 | Li et al. |
| 8,169,944 B2 | 5/2012 | Walton et al. |
| 8,199,632 B2 | 6/2012 | Geile et al. |
| 8,320,301 B2 | 11/2012 | Walton et al. |
| 8,406,114 B2 | 3/2013 | Sandhu |
| 8,792,325 B1 | 7/2014 | Narasimha |
| 9,166,741 B2 | 10/2015 | Maltsev et al. |
| 10,638,468 B2 | 4/2020 | Nelson et al. |
| 2001/0024956 A1 | 9/2001 | You et al. |
| 2002/0027957 A1 | 3/2002 | Paulraj et al. |
| 2002/0154705 A1 | 10/2002 | Walton et al. |
| 2002/0159537 A1 | 10/2002 | Crilly, Jr. |
| 2003/0026324 A1 | 2/2003 | Li et al. |
| 2003/0076812 A1 | 4/2003 | Benedittis |
| 2003/0086371 A1 | 5/2003 | Walton et al. |
| 2003/0103584 A1 | 6/2003 | Bjerke et al. |
| 2003/0134656 A1 | 7/2003 | Chang et al. |
| 2003/0198179 A1 | 10/2003 | Koo et al. |
| 2004/0001429 A1 | 1/2004 | Ma et al. |
| 2004/0063450 A1 | 4/2004 | Uhlik |
| 2004/0066740 A1* | 4/2004 | Suh ............... H04L 27/2605 370/208 |
| 2004/0114504 A1 | 6/2004 | Jung et al. |
| 2004/0114566 A1 | 6/2004 | Lim et al. |
| 2004/0136464 A1 | 7/2004 | Suh et al. |
| 2004/0141548 A1* | 7/2004 | Shattil ............ H04L 27/2614 375/146 |
| 2004/0166886 A1 | 8/2004 | Laroia et al. |
| 2004/0170228 A1* | 9/2004 | Vadde ............. H04L 25/497 375/260 |
| 2004/0174845 A1 | 9/2004 | Koo et al. |
| 2004/0257978 A1 | 12/2004 | Shao et al. |
| 2005/0002323 A1 | 1/2005 | Hadad |
| 2005/0030887 A1 | 2/2005 | Jacobsen et al. |
| 2005/0030931 A1 | 2/2005 | Sung et al. |
| 2005/0058058 A1 | 3/2005 | Cho et al. |
| 2005/0080576 A1 | 4/2005 | Dickerson et al. |
| 2005/0101326 A1 | 5/2005 | Kang et al. |
| 2005/0153723 A1 | 7/2005 | Hosur et al. |
| 2005/0163244 A1 | 7/2005 | Seto et al. |
| 2005/0185796 A1 | 8/2005 | Lablans |
| 2005/0232183 A1 | 10/2005 | Sartori et al. |
| 2010/0111017 A1 | 5/2010 | Um et al. |
| 2011/0292881 A1 | 12/2011 | Li et al. |

FOREIGN PATENT DOCUMENTS

| | | |
|---|---|---|
| EP | 1635494 | 4/2010 |
| KR | 2003-0058589 | 7/2003 |
| KR | 2005-0015119 | 2/2005 |
| KR | 2006-0055636 | 5/2006 |
| KR | 100585233 | 5/2006 |
| WO | 2000/035121 | 6/2000 |
| WO | 2001/061880 | 8/2001 |
| WO | 2003/075500 | 9/2003 |
| WO | 2005/050887 | 6/2005 |

OTHER PUBLICATIONS

IN RE NEO Wireless, LLC Patent Litig., Declaration of William Alberth in Support of Neo Wireless's Opening Claim Construction Brief, U.S. District Court for the Eastern District of Michigan, Southern Division, 2:22-MD-03034-TGB (Feb. 16, 2023).

IN RE NEO Wireless, LLC Patent Litig., Defendants' Responsive Claim Construction Brief, U.S. District Court for the Eastern District of Michigan, Southern Division, 2:22-MD-03034-TGB (Mar. 16, 2023).

IN RE NEO Wireless, LLC Patent Litig., Declaration of Dr. Robert Akl, D. Sc., in Support of Defendants' Responsive Claim Construction Brief, U.S. District Court for the Eastern District of Michigan, Southern Division, 2:22-MD-03034-TGB (Mar. 15, 2023).

Li et al., Orthogonal Frequency Division Multiplexing for Wireless Communications, Springer Science+Business Media, Inc., Chapter 6, pp. 200-244 (2006).

Third Generation Partnership Project, "Technical Specification Group Radio Access Network; Spreading and modulation (FDD) (Release 5)," 3GPP TS 25.213 V5.5.0 (Dec. 2003).

Third Generation Partnership Project, "Technical Specification Group Radio Access Network; Spreading and modulation (FDD) (Release 6)," 3GPP TS 25.213 V6.1.0 (Dec. 2004).

(56) References Cited

OTHER PUBLICATIONS

IN RE NEO Wireless, LLC Patent Litig., Plaintiff NEO Wireless, LLC's Reply Claim Construction Brief, U.S. District Court for the Eastern District of Michigan, Southern Division, 2:22-MD-03034-TGB (Mar. 30, 2023).

IN RE NEO Wireless, LLC Patent Litig., Declaration of William Alberth in Support of NEO Wireless's Reply Claim Construction Brief, U.S. District Court for the Eastern District of Michigan, Southern Division, 2:22-MD-03034-TGB (Mar. 30, 2023).

*American Honda Motor Co., Inc.* v. *NEO Wireless LLC,* Petition for Inter Partes Review of U.S. Pat. No. 8,467,366, IPR 2023-00790 (Mar. 20, 2023).

Chang, "IEEE 802.16 Plenary Session #16 Minutes," IEEE 802.16-01/61r2 (Nov. 19, 2001).

"Minutes of IEEE 802.16 Session #15," IEEE 802.16-01/50 (Oct. 3, 2001).

IEEE Wirelessman, Unapproved Working Document, Local and Metropolitan Area Networks—Part 16: Standard Air Interface for Fixed Broadband Wireless Access Systems—Media Access Control Modifications and Additional Physical Layer for 2-11 GHz, P802.16ab-01/01r2 (Sep. 28, 2001).

Ad-Hoc 9 Chairman, "Report on ad-hoc 9 activities between WG1#6 and WG1#7," TSG-RAN Working Group 1 meeting #3, TSGR1#7(99)a78, Hanover, Germany (Aug. 30-Sep. 3, 1999).

ANSI/IEEE Std 802.11, 1999 Edition (R2003), Information technology—Telecommunications and information exchange between systems—Local and metropolitan area networks—Specific requirements—Part 11: Wireless LAN Medium Access Control (MAC) and Physical Layer (PHY) Specifications (Reaffirmed Jun. 12, 2003).

Baxley et al., "Power Savings Analysis of Peak-to-Average Power Ratio Reduction in OFDM," IEEE Transactions on Consumer Electronics, vol. 50, No. 3 (Aug. 2004).

Bingham, "Multicarrier Modulation for Data Transmission: An Idea Whose Time Has Come," IEEE Communications Magazine (May 1990).

Chang, "Synthesis of Band-Limited Orthogonal Signals for Multichannel Data Transmission," The Bell System Technical Journal (Dec. 1966).

Cimini, "Analysis and Simulation of a Digital Mobile Channel Using Orthogonal Frequency Division Multiplexing," IEEE Transactions on Communications, vol. Com-22, No. 7 (Jul. 1985).

Davis et al., "Peak-to-Mean Power Control in OFDM, Golay Complementary Sequences, and Reed-Muller Codes," IEEE Transactions on Information Theory, vol. 45, No. 7, pp. 2397-2417 (Nov. 1999).

Definition of "guard band," McGraw Hill Dictionary of Scientific and Technical Terms, 6th edition (2003).

*Dell Inc et al.* v. *NEO Wireless LLC,* Declaration of William P. Alberth, Jr., IPR2021-01480, U.S. Pat. No. 8,467,366 (Dec. 20, 2021).

*Dell Inc et al.* v. *NEO Wireless LLC,* Patent Owner's Preliminary Response, IPR2021-01480, U.S. Pat. No. 8,467,366 (Dec. 20, 2021).

*Dell Inc et al.* v. *NEO Wireless LLC,* Decision Denying institution of Inter Partes Review of U.S. Pat. No. 8,467,366, IPR 2021-01480 (Mar. 16, 2022).

*Dell Inc et al.* v. *NEO Wireless LLC,* Declaration of Craig Bishop, Inter Partes Review of U.S. Pat. No. 8,467,366 and U.S. Pat. No. 10,833,908 (Sep. 2, 2021).

*Dell Inc et al.* v. *NEO Wireless LLC,* Declaration of Dr. Matthew Valenti, Inter Partes Review of U.S. Pat. No. 8,467,366 (Sep. 15, 2021).

*Dell Inc et al.* v. *NEO Wireless LLC,* Petition for Inter Partes Review of U.S. Pat. No. 8,467,366 pursuant to 35 U.S.C. §§ 311-319, 37 C.F.R. § 42 (Sep. 16, 2021).

ETSI Special Mobile Group (SMG) Report of UMTS 30.06 V3.0.0; Universal Mobile Telecommunications System (Umts); Umts Terrestrial Radio Access (UTRA); Concept evaluation (UMTS 30.06 version 3.0.0), TR 101 146 V3.0.0 (Dec. 1997).

Fu et al., "Initial Uplink Synchronization and Power Control (Ranging Process) for OFDMA Systems," Proceedings of the IEEE Globecom, vol. 6, pp. 3999-4003 (2004).

Gibson, The Mobile Communications Handbook, $2^{nd}$ Edition, CRC Press LLC (1999).

Gudmundson et al., "Adjacent Channel Interference in an OFDM System," Proceedings of the Vehicular Technical Conference (1996).

Guo et al., "Reducing Peak-to-Average Power Ratio in OFDM Systems by Adaptive Dynamic Range Companding," 2002 World Wireless Congress, San Francisco, CA (2002).

IEEE 802.16 Broadband Wireless Access Working Group, "IEEE 802.16b PHY Strawman," IEEE 802.16.4-01/12 (May 8, 2001).

IEEE Standard for Local and metropolitan area networks, Part 16: Air Interface for Fixed Broadband Wireless Access Systems—Amendment 1: Detailed System Profiles for 10-66 GHz, IEEE 802.16c-2002 (Jan. 15, 2003).

IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz, IEEE Std. 802.16a-2003 (Apr. 1, 2003).

IN RE NEO Wireless, LLC Patent Litig., Defendants' Proposed Interpretations, U.S. District Court for the Eastern District of Michigan, Southern Division, 2:22-MD-03034-TGB (Dec. 30, 2022).

IN RE NEO Wireless, LLC Patent Litig., Joint Claim Construction Statement, U.S. District Court for the Eastern District of Michigan, Southern Division, 2:22-MD-03034-TGB (Jan. 18, 2023).

IN RE NEO Wireless, LLC Patent Litig., Neo Wireless, LLC's Answer to Ford Motor Company's Counterclaims, U.S. District Court for the Eastern District of Michigan, Southern Division, 2:22-MD-03034-TGB (Jan. 7, 2023).

IN RE NEO Wireless, LLC Patent Litig., Neo Wireless, LLC's Comments on the Defendants' First Technology Tutorial, U.S. District Court for the Eastern District of Michigan, Southern Division, 2:22-MD-03034-TGB (Jan. 30, 2023).

IN RE NEO Wireless, LLC Patent Litig., Plaintiff NEO Wireless, LLC's Disclosure of Proposed Interpretations and Evidence of Disputed Claim Terms, U.S. District Court for the Eastern District of Michigan, Southern Division, 2:22-MD-03034-TGB (Dec. 30, 2022).

IN RE NEO Wireless, LLC Patent Litigation, Defendants' Preliminary Invalidity and Unenforceability Contentions, 2:22-MD-03034-TGB (Nov. 16, 2022).

IN RE NEO Wireless, LLC Patent Litigation, Patent Invalidity Claim Chart for U.S. Pat. No. 8,467,366 to IEEE Std. 802.16.4c-01/01 IEEE 802.16 Broadband Wireless Access Working Group Initial OFDMA proposal for the 802.16.4 PHY layer, submitted as Exhibit A-01 to Defendants' Preliminary Invalidity and Unenforceability Contentions, 2:22-MD-03034-TGB (Nov. 16, 2022).

IN RE NEO Wireless, LLC Patent Litigation, Patent Invalidity Claim Chart for U.S. Pat. No. 8,467,366 to U.S. Pat. No. 7,088,782, submitted as Exhibit A-09 to Defendants' Preliminary Invalidity and Unenforceability Contentions, 2:22-MD-03034-TGB (Nov. 16, 2022).

IN RE NEO Wireless, LLC Patent Litigation, Patent Invalidity Claim Chart for U.S. Pat. No. 8,467,366 to U.S. Pat. No. 7,551,546, submitted as Exhibit A-08 to Defendants' Preliminary Invalidity and Unenforceability Contentions, 2:22-MD-03034-TGB (Nov. 16, 2022).

IN RE NEO Wireless, LLC Patent Litigation, Patent Invalidity Claim Chart for U.S. Pat. No. 8,467,366 to US 2004/0114504, submitted as Exhibit A-07 to Defendants' Preliminary Invalidity and Unenforceability Contentions, 2:22-MD-03034-TGB (Nov. 16, 2022).

IN RE NEO Wireless, LLC Patent Litigation, Patent Invalidity Claim Chart for U.S. Pat. No. 8,467,366 to KR 2003-0058589, submitted as Exhibit A-06 to Defendants' Preliminary Invalidity and Unenforceability Contentions, 2:22-MD-03034-TGB (Nov. 16, 2022).

IN RE NEO Wireless, LLC Patent Litigation, Patent Invalidity Claim Chart for U.S. Pat. No. 8,467,366 to US 2004/0066740,

(56) References Cited

OTHER PUBLICATIONS submitted as Exhibit A-05 to Defendants' Preliminary Invalidity and Unenforceability Contentions, 2:22-MD-03034-TGB (Nov. 16, 2022).
IN RE NEO Wireless, LLC Patent Litigation, Patent Invalidity Claim Chart for U.S. Pat. No. 8,467,366 to U.S. Pat. No. 7,483,367, submitted as Exhibit A-04 to Defendants' Preliminary Invalidity and Unenforceability Contentions, 2:22-MD-03034-TGB (Nov. 16, 2022).
IN RE NEO Wireless, LLC Patent Litigation, Patent Invalidity Claim Chart for U.S. Pat. No. 8,467,366 to 802.16ab-01/01r1, submitted as Exhibit A-03 to Defendants' Preliminary Invalidity and Unenforceability Contentions, 2:22-MD-03034-TGB (Nov. 16, 2022).
IN RE NEO Wireless, LLC Patent Litigation, Patent Invalidity Claim Chart for U.S. Pat. No. 8,467,366 to 82.16a-2003, submitted as Exhibit A-02 to Defendants' Preliminary Invalidity and Unenforceability Contentions, 2:22-MD-03034-TGB (Nov. 16, 2022).
Information Technology—Telecommunications and information Exchange Between Systems—LAN/MAN Specific Requirements—Air Interface for Fixed Broadband Wireless Access Systems Part A: Systems between 2 and 11 GHz, IEEE 802.16ab-01/01r1 (Jul. 2001).
Interdigital, "Outer Loop Power Control for TDD Mode," 3GPP TSG RAN WG2 #6, RAN WG2 777/99, Sophia Antipolis (Aug. 17-20, 1999).
International Search Report and Written Opinion; International Patent Application No. PCT/US05/08169; Filed Mar. 9, 2005; Applicant: Waltical Solutions, Inc.; Mailed Jun. 9, 2005; 9 pages.
Johnston et al., "Peering Into the WiMAX Spec: Part 1," EE Times (Jan. 20, 2004) available at www.eetimes.com/designline/wireless-and-networking-designline.
Koffman et al., "Broadband Wireless Access Solutions Based on OFDM Access in IEEE 802.16," IEEE Communications Magazine, pp. 96-103 (Apr. 2002).
Krinock et al., "Fast and Efficient BW Request Mechanism for IEEE 802.16a OFDM PHY" IEEE 802.16abc-01/61 (Nov. 12, 2001).
Lee, "OFDMA Uplink Ranging for IEEE 802.16e Using Modified Generalized Chirp-Like Polyphase Sequences," 1st IEEE and IFIP International Conference in Central Asia on Internet (2005).
Li et al., "Bit-Interleaved Coded Modulation with Iterative Decoding and 8PSK Signaling," IEEE Transactions on Communications, vol. 50., No. 8 (Aug. 2002).
Lim et al., "Short Initial Ranging Transmission for IEEE 802.16 OFDMA," IEEE C802.16e-03/53r2 (Sep. 11, 2003).
Marks, "IEEE Standard 802.16: A Technical Overview of the WirelessMAN Air Interface for Broadband Wireless Access," IEEE C802.16-02/05 (Jun. 4, 2002).
Muller et al., "A Comparison of Peak Power Reduction Schemes for OFDM," IEEE Global Telecommunications Conference. vol. 1, pp. 1-5 (1997).
Muller et al., "A Novel Peak Power Reduction Scheme for OFDM," Proceedings of the International Symposium on Personal, Indoor and Mobile Radio Communications, pp. 1090-1094, Helsinki, Finland (Sep. 1997).
Muquet et al., "OFDM with Trailing Zeros Versus OFDM with Cyclic Prefix: Links, Comparisons and Application to the Hiperlan/2 System," IEEE International Conference on Communications, vol. 2, pp. 1049-1053 (2000).
NEO Wireless LLC v. American Honda Motor Co., Inc et al., and NEO Wireless LLC v. Nissan North America Inc et al., Defendants Honda and Nissan's Motion to Dismiss Plaintiff's Claims of Willful and Induced Patent Infringement, Civil Action Nos. 2:22-cv-11403-TGB and Civil Action Nos. 2:22-cv-11405-TGB (Aug. 10, 2022).
NEO Wireless LLC v. American Honda Motor Co., Inc et al., Defendants' Motion to Dismiss Plaintiff's Complaint, Civil Action No. 2:22-cv-01824-EAS-KAJ (Jun. 21, 2022).
NEO Wireless LLC v. American Honda Motor Co., Inc et al., Plaintiff NEO Wireless LLC's Complaint for Patent Infringement,
United States District Court for the Southern District of Ohio Eastern Division at Columbus, Case No. 2:22-cv-01824-EAS-KAJ (Mar. 29, 2022).
NEO Wireless LLC v. American Honda Motor Co., Inc et al., Plaintiff NEO Wireless, LLC's First Amended Complaint for Patent Infringement, Civil Action No. 2:22-cv-11403-TGB (Jul. 20, 2022).
NEO Wireless LLC v. Apple Inc., Apple Inc's Answer to Plaintiff's First Amended Complaint, Civil Action No. 6:21-cv-00026-ADA (Jun. 17, 2021).
NEO Wireless LLC v. Apple Inc., Plaintiff's First Amended Complaint, Civil Action No. 6:21-cv-0026 (Apr. 28, 2021).
NEO Wireless LLC v. Dell Technologies Inc et al., Declaration of Roger Fulgham in Support of Defendants' Opening Claim Construction, Civil Action No. 6:21-cv-0024 (Oct. 28, 2021).
NEO Wireless LLC v. Dell Technologies Inc et al., Declaration of James Proctor in Support of Defendants' Opening Claim Construction Brief, Civil Action No. 6:21-cv-0024 (Oct. 27, 2021).
NEO Wireless LLC v. Dell Technologies Inc et al., Declaration of William Alberth in Support of Neo Wireless's Responsive Claim Construction Brief, Civil Action No. 6:21-cv-0024 (Nov. 18, 2021).
NEO Wireless LLC v. Dell Technologies Inc et al., Defendant's Answer, Affirmative Defenses, and Counterclaims to Plaintiff's First Amended Complaint, Civil Action No. 6:21-cv-0024 (Jun. 18, 2021).
NEO Wireless LLC v. Dell Technologies Inc et al., Defendants' Opening Claim Construction Brief, Civil Action No. 6:21-cv-0024 (Oct. 28, 2021).
NEO Wireless LLC v. Dell Technologies Inc et al., Defendants' Reply Claim Construction Brief, Civil Action No. 6:21-cv-0024 (Dec. 2, 2021).
NEO Wireless LLC v. Dell Technologies Inc et al., Joint Claim Construction Statement, Civil Action No. 6:21-cv-0024 (Dec. 21, 2021).
NEO Wireless LLC v. Dell Technologies Inc et al., Neo Wireless's Answer to Dell's Counterclaims, Civil Action No. 6:21-cv-0024 (Jul. 9, 2021).
NEO Wireless LLC v. Dell Technologies Inc et al., Plaintiff Neo Wireless LLC's Responsive Claim Construction Brief, Civil Action No. 6:21-cv-0024 (Nov. 18, 2021).
NEO Wireless LLC v. Dell Technologies Inc et al., Plaintiff Neo Wireless LLC's Claim Construction Sur Reply Brief, Civil Action No. 6:21-cv-0024 (Dec. 16, 2021).
NEO Wireless LLC v. Dell Technologies Inc et al., Plaintiff Neo Wireless LLC's Response to Defendants' Supplemental Claim Construction Brief, C.A. No. 1:22-cv-60-DAE (Jun. 8, 2022).
NEO Wireless LLC v. Dell Technologies Inc et al., Stipulated Constructions, Civil Action No. 6:21-cv-0024 (Oct. 27, 2021).
NEO Wireless LLC v. Dell Technologies Inc et al., Supplemental Declaration of James Proctor in Support of Defendants' Reply Claim Construction Brief, Civil Action No. 6:21-cv-0024 (Dec. 2, 2021).
NEO Wireless LLC v. Dell Technologies Inc et al., Defendants Preliminary Invalidity Contentions, U.S. District Court for the Western District of Texas, Waco Division, Civil Action No. 6:21-CV-00024-ADA (Sep. 10, 2021).
NEO Wireless LLC v. Dell Technologies Inc et al., Plaintiff's First Amended Complaint, Civil Action No. 6:21-cv-0024 (Apr. 28, 2021).
NEO Wireless LLC v. FCA US, LLC, Plaintiff Neo Wireless LLC's Complaint for Patent Infringement, Civil Action No. 3:22-cv-01252 (Jul. 15, 2022).
NEO Wireless LLC v. Ford Motor Company, Ford Motor Company's Motion to Dismiss, Civil Action No. 4:22-va-00210-GAF (Jun. 21, 2022).
NEO Wireless LLC v. Ford Motor Company, Plaintiff NEO Wireless LLC's Complaint for Patent Infringement, United States District Court for the Western District of Missouri Western Division, Case No. 4:22-cv-00210-GAF (Mar. 29, 2022).
NEO Wireless LLC v. Ford Motor Company, Plaintiff NEO Wireless, LLC's First Amended Complaint for Patent Infringement, Civil Action No. 2:22-cv-11402-TGB (Jul. 20, 2022).

(56) References Cited

OTHER PUBLICATIONS

*NEO Wireless LLC* v. *General Motors Company et al.*, Defendants General Motor Company and General Motors LLC's Answer to Complaint, Civil Action No. 2:22-cv-0094-JRG-RSP (Jun. 21, 2022).
*NEO Wireless LLC* v. *General Motors Company et al.*, Plaintiff NEO Wireless LLC's Complaint for Patent Infringement, United States District Court for the Eastern District of Texas Marshall Division, Case No. 2:22-cv-00094 (Mar. 29, 2022).
*NEO Wireless LLC* v. *General Motors Company et al.*, Plaintiff NEO Wireless, LLC's First Amended Complaint for Patent Infringement, Civil Action No. 2:22-cv-11407-TGB (Jul. 20, 2022).
*NEO Wireless LLC* v. *LG Electrincs Inc.*, Defendant LG's Answer to Plaintiff's First Amended Complaint, Civil Action No. 6:21-cv-00025-ADA (Jun. 17, 2021).
*NEO Wireless LLC* v. *LG Electronics Inc. et al.*,Plaintiff's First Amended Complaint, Civil Action No. 6:21-cv-0025 (Apr. 28, 2021).
*NEO Wireless LLC* v. *Mercedes-Benz USA, LLC*, Plaintiff Neo Wireless LLC's Complaint for Patent Infringement, Civil Action No. 3:22-cv-00780 (Jul. 15, 2022).
*NEO Wireless LLC* v. *Nissan North America Inc et al.*, Defendants' Motion to Dismiss the Complaint Pursuant to Rule 12(b)(6), Civil Action No. 3:22-cv-00220 (Jun. 21, 2022).
*NEO Wireless LLC* v. *Nissan North America Inc et al.*, Plaintiff NEO Wireless LLC's Complaint for Patent Infringement, United States District Court for the Middle District of Tennessee Nashville Division, Case No. 3:22-cv-00220 (Mar. 29, 2022).
*NEO Wireless LLC* v. *Nissan North America Inc et al.*, Plaintiff NEO Wireless, LLC's First Amended Complaint for Patent Infringement, Civil Action No. 2:22-cv-11405-TGB (Jul. 20, 2022).
*NEO Wireless LLC* v. *Tesla Inc.*, Defendant Tesla, Inc.'s Answer to Complaint, Civil Action No. 2:22-cv-0095-JRG-RSP (Jun. 21, 2022).
*NEO Wireless LLC* v. *Tesla Inc.*, Plaintiff NEO Wireless LLC's Complaint for Patent Infringement, United States District Court for the Eastern District of Texas Marshall Division, Case No. 2:22-cv-00095 (Mar. 29, 2022).
*NEO Wireless LLC* v. *Tesla Inc.*, Plaintiff NEO Wireless, LLC's First Amended Complaint for Patent Infringement, Civil Action No. 2:22-cv-11408-TGB (Jul. 20, 2022).
*NEO Wireless LLC* v. *Toyota Motor Corporation et al.*, Plaintiff NEO Wireless, LLC's First Amended Complaint for Patent Infringement, Civil Action No. 2:22-cv-00093-JRG-RSP (Jun. 24, 2022).
*NEO Wireless LLC* v. *Toyota Motor North America, Inc et al.*, Plaintiff NEO Wireless LLC's Complaint for Patent Infringement, United States District Court for the Eastern District of Texas Marshall Division, Case No. 2:22-cv-00093 (Mar. 29, 2022).
*NEO Wireless LLC* v. *Volkswagen Group of America, Inc et al.*, Defendants Volkswagen Group of America, Inc. and Volkswagen Group of America Chattanooga Operations, LLC's Motion to Dismiss Pursuant to Federal Rule of Civil Procedure 12(b)(6), Civil Action No. 2:22-cv-11404-TGB (Aug. 10, 2022).
*NEO Wireless LLC* v. *Volkswagen Group of America, Inc et al.*, Plaintiff NEO Wireless, LLC's First Amended Complaint for Patent Infringement, Civil Action No. 2:22-cv-11404-TGB (Jul. 20, 2022).
*NEO Wireless LLC* v. *Volkswagen Group of America, Inc., et al.*, Plaintiff NEO Wireless LLC's Complaint for Patent Infringement, United States District Court for the Eastern District of Tennessee Chattanooga District, Case No. 1:22-cv-00076 (Mar. 29, 2022).
NEO Wireless LLC, Claim Chart—Claim 1 of U.S. Pat. No. 8,467,366, submitted with Plaintiff's First Amended Complaint, *Neo Wireless LLC* v. *Dell, Inc et al.*, Civil Action No. 6:21-cv-0024 (Apr. 28, 2021).
NEO Wireless LLC, Claim Chart—Claim 1 of U.S. Pat. No. 8,467,366, submitted with Plaintiff's First Amended Complaint, *Neo Wireless LLC* v. *American Honda Motor Co., Inc et al.*, Civil Action No. 2:22-cv-11403-TGB (Jul. 20, 2022).
NEO Wireless LLC, Claim Chart—Claim 1 of U.S. Pat. No. 8,467,366, submitted with Plaintiff's First Amended Complaint, *Neo Wireless LLC* v. *Volkswagen Group of America, Inc et al.*, Civil Action No. 2:22-cv-11404-TGB (Jul. 20, 2022).

NEO Wireless LLC, Claim Chart—Claim 1 of U.S. Pat. No. 8,467,366, submitted with Plaintiff's First Amended Complaint, *Neo Wireless LLC* v. *Nissan North America Inc et al.*, Civil Action No. 2:22-cv-11405-TGB (Jul. 20, 2022).
NEO Wireless LLC, Claim Chart—Claim 1 of U.S. Pat. No. 8,467,366, submitted with Plaintiff's First Amended Complaint, *Neo Wireless LLC* v. *Toyota Motor Corporation et al.*, Civil Action No. 2:22-cv-00093-JRG-RSP (Jun. 24, 2022).
NEO Wireless LLC, Claim Chart—Claim 1 of U.S. Pat. No. 8,467,366, submitted with Plaintiff's First Amended Complaint, *Neo Wireless LLC* v. *General Motor Company et al.*, Civil Action No. 2:22-cv-11407-TGB (Jul. 20, 2022).
NEO Wireless LLC, Claim Chart—Claim 1 of U.S. Pat. No. 8,467,366, submitted with Plaintiff's First Amended Complaint, *Neo Wireless LLC* v. *Tesla Inc.*, Civil Action No. 2:22-cv-11408-TGB (Jul. 20, 2022).
NEO Wireless LLC, Claim Chart—Claim 1 of U.S. Pat. No. 8,467,366, submitted with Plaintiff's First Amended Complaint, *Neo Wireless LLC* v. *v. Ford Motor Company*, Civil Action No. 2:22-cv-11402-TGB (Jul. 20, 2022).
NEO Wireless LLC, Claim Chart—Claim 1 of U.S. Pat. No. 8,467,366, submitted with Plaintiff's Complaint for Patent Infringement, *Neo Wireless LLC* v. *Mercedes-Benz USA, LLC*, Civil Action No. 3:22-cv-00780 (Jul. 15, 2022).
NEO Wireless LLC, Claim Chart—Claim 1 of U.S. Pat. No. 8,467,366, submitted with Plaintiff's Complaint for Patent Infringement, *Neo Wireless LLC* v. *FCA US, LLC*, Civil Action No. 3:22-cv-00780 (Jul. 15, 2022).
*NEO Wireless, LLC* v. *American Honda Motor Co., Inc et al.* and *NEO Wireless, LLC* v. *Nissan North America Inc et al.*, Plaintiff Neo Wireless, LLC's Response to Defendants Honda and Nissan's Motion to Dismiss Plaintiff's Claims of Willful and Induced Patent Infringement, 2:22-CV-03034-TGB (Sep. 1, 2022).
*NEO Wireless, LLC* v. *American Honda Motor Co., Inc et al.* and *NEO Wireless, LLC* v. *Nissan North America Inc et al.*, Plaintiff Neo Wireless, LLC's Response to Defendants Honda and Nissan's Motion to Dismiss Plaintiff's Claims of Willful and Induced Patent Infringement, 2:22-CV-11403-TGB (Aug. 31, 2022).
*NEO Wireless, LLC* v. *American Honda Motor Co., Inc et al.* and *NEO Wireless, LLC* v. *Nissan North America Inc et al.*, Defendants Honda and Nissan's Reply Brief in Support of their Motion to Dismiss Plaintiff's Claims of Willful and Induced Patent Infringement, Case No. 2:22-cv-11403-TGB and Case No. 2:22-cv-11405-TGB (Sep. 14, 2022).
*NEO Wireless, LLC* v. *Dell Technologies Inc et al.*, Defendants' Supplemental Claim Construction Brief, Civil Action No. 1:22-cv-00060-DAE (May 18, 2022).
*NEO Wireless, LLC* v. *FCA US, LLC*, Defendant FCA US LLC's Answer and Defenses to Neo Wireless, LLC's Complaint, Case No. 2:22-cv-11770-TGB (Sep. 12, 2022).
*NEO Wireless, LLC* v. *FCA US, LLC*, Defendant FCA US LLC's First Amended Answer and Defenses to Neo Wireless LLC's Complaint, 2:22-cv-11770-TGB (Dec. 16, 2022) (In re Neo Wireless LLC Patent Litig, 2:22-MD-03034-TGB).
*NEO Wireless, LLC* v. *Ford Motor Company*, Ford Motor Company's Amended Answer to First Amended Complaint for Patent Infringement, 2:22-cv-11402-TGB (Dec. 16, 2022) (In re Neo Wireless LLC Patent Litig, 2:22-MD-03034-TGB).
*NEO Wireless, LLC* v. *Ford Motor Company*, Ford Motor Company's Answer to First Amended Complaint for Patent Infringement, Affirmative Defense in RE NEO Wireless, LLC Patent Litigation, Patent Invalidity Claim Chart to U.S. Pat. No. 2003/0125040, submitted as Exhibit C-06 to Defendants' Preliminary Invalidity and Unenforceability Contentions, 2:22-MD-03034-TGB (Nov. 16, 2022).es, and Counterclaims, Case No. 2:22-cv-11402-TGB (Aug. 24, 2022).
*NEO Wireless, LLC* v. *Ford Motor Company*, Neo Wireless, LLC's Answer to Ford Motor Company's Counterclaims, Case: 2:22-cv-11402-TGB (Sep. 14, 2022).
*NEO Wireless, LLC* v. *General Motors Company et al.*, The General Motors Defendants Answer to First Amended Complaint, 2:22-CV-11407-TGB (Aug. 24, 2022).

(56) References Cited

OTHER PUBLICATIONS

*NEO Wireless, LLC* v. *General Motors Company et al.*, The General Motors Defendants First Amended Answer to Complaint, 2:22-CV-11407-TGB (Dec. 16, 2022) (In re Neo Wireless LLC Patent Litig, 2:22-MD-03034-TGB).
*NEO Wireless, LLC* v. *Mercedes-Benz USA, LLC*, Defendant Mercedes-Benz USA, LLC's Motion to Dismiss under Rule 12(b)(6), Case No. 2:22-CV-11769-TGB (Sep. 12, 2022).
*NEO Wireless, LLC* v. *Mercedes-Benz USA, LLC*, Defendant Mercedes-Benz USA's partial Answer to Plaintiff Neo Wireless, LLC's Complaint for Patent Infringement, Case No. 2:22-CV-11769-TGB (Sep. 29, 2022).
*NEO Wireless, LLC* v. *Mercedes-Benz USA, LLC*, Defendant Mercedes-Benz USA's First Amended Partial Answer to Plaintiff Neo Wireless LLC's Complaint for Patent Infringement, 2:22-CV-11769-TGB (Dec. 16, 2022) (In re Neo Wireless LLC Patent Litig, 2:22-MD-03034-TGB).
*NEO Wireless, LLC* v. *Mercedes-Benz USA, LLC*, Plaintiff Neo Wireless, LLC's Response to Defendant Mercedes-Benz USA, LLC's Motion to Dismiss Pursuant to Federal Rule of Civil Procedure 12(B)(6), Case No. 2:22-CV-11769-TGB (Oct. 3, 2022).
*NEO Wireless, LLC* v. *Tesla, Inc.*, Tesla's Amended Answer to Complaint, 2:22-CV-11408-TGB (Dec. 16, 2022) (In re Neo Wireless LLC Patent Litig, 2:22-MD-03034-TGB).
*NEO Wireless, LLC* v. *Tesla, Inc.*, Tesla's Answer to Amended Complaint, 2:22-CV-11408-TGB (Aug. 24, 2022).
*NEO Wireless, LLC* v. *Toyota Motor Corporation et al.*, Defendants' Answer and Affirmative Defenses to Plaintiff's First Amended Complaint for Patent Infringement, No. 2:22-CV-11406-TGB (Aug. 24, 2022).
*NEO Wireless, LLC* v. *Toyota Motor Corporation et al.*, Defendants' First Amended Answer and Affirmative Defenses to Plaintiff's First Amended Complaint for Patent Infringement, No. 2:22-cv-11406-TGB (Dec. 16, 2022) (In re Neo Wireless LLC Patent Litig, 2:22-MD-03034-TGB).
*NEO Wireless, LLC* v. *Volkswagen Group of America, Inc et al.*, Plaintiff Neo Wireless, LLC's Response to Volkswagen Defendants' Motion to Dismiss Pursuant to Federal Rule of Civil Procedure 12(b)(6), 2:22-CV-11404-TGB (Aug. 31, 2022).
*NEO Wireless, LLC* v. *Volkswagen Group of America, Inc., et al.*, Volkswagen Defendants' Reply in Support of their Motion to Dismiss Pursuant to Federal Rule of Civil Procedure 12(b)(6), Case No. 2:22-cv-11404 (Sep. 14, 2022).
Notice of Allowance, U.S. Appl. No. 13/205,579, Mail Date Mar. 6, 2013, Examiner A. Akinyemi, 14 pages.
Panta et al., "Use of Peak-to-Average Power Reduction Technique in HIPERLAN2 and its Performance in a Fading Channel." Proc. 6th International Symposium on DSP for Communication Systems, pp. 113-117, (2002).
Popovic, "Generalized Chirp-Like Polyphase Sequences with Optimum Correlation Properties," IEEE Transactions on Information Theory, vol. 38, No. 4, pp. 1406-1409 (Jul. 1992).
Prasad, "Chapter 6—The Peak Power Problem," in OFDM for Wireless Communications Systems, Artech House (2004).
Segal et al., "Initial OFDMA Proposal for the 802.16.4 PHY Layer," IEEE 802.16.44c-01/01 (Jan. 11, 2001).
Sklar, Digital Communications, Fundamentals and Applications, 2nd edition, Prentice Hall PTR, pp. 7-9 (2001).
Third Generation Partnership Project, "Technical Specification Group Radio Access Network; Physical layer procedures (FDD) (Release 5)," 3GPP TS 25.214 V5.7.0 (Dec. 2003).
Third Generation Partnership Project, "Technical Specification Group Radio Access Network; Physical layer procedures (FDD) (Release 5)," 3GPP TS 25.214 V5.10.0 (Dec. 2004).
Third Generation Partnership Project, "Technical Specification Group Radio Access Network; Physical layer procedures (FDD) (Release 6)," 3GPP TS 25.214 V6.0.0 (Dec. 2003).
Third Generation Partnership Project, "Technical Specification Group Radio Access Network; Physical layer procedures (FDD) (Release 6)," 3GPP TS 25.214 V6.4.0 (Dec. 2004).
Tonello et al., "Analysis of the Uplink of an Asynchronous Multi-User DMT OFDMA System Impaired by Time Offsets, Frequency Offsets, and Multi-path Fading," Proceedings of the Vehicular Technology Conference, pp. 1094-1099 (2000).
Universal Mobile Telecommunications System (UMTS); UMTS Terrestrial Radio Access (UTRA); Concept evaluation (UMTS 30.06 version 3.0.0), TR 101 146 V3.0.0 (Dec. 1997).
Van Nee et al., "Reducing the Peak-to-Average Power Ratio of OFDM," IEEE Vehicular Technology Conference, vol. 3, pp. 2072-2076 (1998).
Van Nee et al., OFDM for Wireless Multimedia Communications, Artech House (2000).
Van Nee, "OFDM Codes for Peak-to-Average Power Reduction and Error Correction," Proceedings of Globecom, vol. 1, pp. 740-744 (1996).
Van Zelst et al., "Implementation of a MIMO OFDM-Based Wireless LAN System," IEEE Transactions on Signal Processing, vol. 52, No. 2 (Feb. 2004).
*Volkswagen Group of America, Inc.* v. *Neo Wireless, LLC*, Declaration of Sylvia Hall-Ellis, Ph.D., Case IPR2023-00426, U.S. Pat. No. 8,467,366 (Jan. 11, 2023).
*Volkswagen Group of America, Inc.* v. *Neo Wireless, LLC*, Petition of Inter Partes Review of U.S. Pat. No. 8,467,366, Case IPR2023-00426 (Jan. 20, 2023).
Wahlqvist et al., "A Conceptual Study of OFDM-based Multiple Access Schemes: Part 1—Air Interface Requirements," (1996).
Wahlqvist et al., "Time Synchronization in the Uplink of an OFDM System," Proceedings of Vehicular Technology Conference, vol. 3, pp. 1569-1573 (Apr. 1996).
You et al., "A Simple Construction of OFDM-CDMA Signals with Low Peak-to-Average Power Ratio," IEEE Transactions on Broadcasting, vol. 49, No. 4 (Dec. 2003).
Zou et al., "COFDM: An Overview," IEEE Transactions on Broadcasting, vol. 41, No. 1 (Mar. 1995).

\* cited by examiner

METHODS AND APPARATUS FOR RANDOM ACCESS IN MULTI-CARRIER COMMUNICATION SYSTEMS

CROSS-REFERENCE TO RELATED APPLICATIONS

This application is a continuation of, and incorporates by reference in its entirety, U.S. application Ser. No. 17/678,562, filed Feb. 23, 2022; which is a continuation of U.S. application Ser. No. 16/544,201, filed Aug. 19, 2019, now U.S. Pat. No. 11,324,049; which is a continuation of U.S. application Ser. No. 15/425,735, filed Feb. 6, 2017, now U.S. Pat. No. 10,390,369; which is a continuation of U.S. application Ser. No. 13/899,226, filed May 21, 2013, now U.S. Pat. No. 9,565,700; which is a continuation of U.S. application Ser. No. 13/205,579, filed Aug. 8, 2011, now U.S. Pat. No. 8,467,366; which is a continuation of U.S. application Ser. No. 10/583,158, filed Aug. 27, 2008, now U.S. Pat. No. 7,995,967; which is a U.S. National Stage Application of PCT/US2005/08169, filed Mar. 9, 2005; which claims the benefit of U.S. Provisional Application No. 60/551,589, filed Mar. 9, 2004; all of which are incorporated by reference in their entirety.

BACKGROUND

In a wireless communication system, a mobile station first needs to perform a random access for establishing communication with a base station. The random access typically includes two steps: (1) Ranging and (2) Resource Request and Allocation. During Ranging, the mobile station sends a signal to the base station, so that the base station can identify the mobile station and measure the power and time delay of the mobile station, and inform the mobile station for power adjustment and time advance. During Resource Request and Allocation, the uplink and downlink resources for communication are requested and allocated. Ranging is a critical part of multi-carrier wireless communication system, and there are several important issues related to ranging:
1. The bandwidth efficiency of the ranging signals
2. The interference of ranging signal with other uplink signals
3. The detection performance and complexity at the base station receiver The ranging process typically involves an exchange of messages between the base station and the mobile station by which the mobile station aligns itself with the start of each time slot after compensating for propagation delay and other factors. One problem in a shared medium communication network involves the ranging of many mobile stations. When many mobile stations attempt to perform the ranging simultaneously, they are forced to contend for access to the shared channel and it becomes difficult for any of the mobile stations to complete the ranging process due to the large number of collisions. As a result, the time needed for all of the mobile stations to complete the ranging process is excessive, and much bandwidth on the shared channel is wasted.

DETAILED DESCRIPTION

In the following description, the invention is explained with respect to some of its various embodiments, and provides specific details for a thorough understanding. However, one skilled in the art will understand that the invention may be practiced without such details. In other instances, well-known structures and functions have not been shown or described in detail to avoid obscuring aspects of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The embodiments of this invention disclose methods and apparatus for random access in a multi-carrier system. In particular, ranging signals are designed to improve receiving reliability and to reduce interference with other uplink signals. Furthermore, methods and apparatus are described that improve the detection performance at the base station receiver.

In a multi-carrier communication system such as multi-carrier code division multiple access (MC-CDMA) and orthogonal frequency division multiple access (OFDMA) systems, information data are multiplexed on subcarriers that are mutually orthogonal in the frequency domain. In effect, a frequency selective channel is partitioned in frequency into a number of parallel, but small, segments that can be treated as flat fading channels and can employ simple one-tap equalizers. The modulation/demodulation can be performed using the fast Fourier transform (FFT).

In a multi-carrier communication system the physical media resource (e.g., radio or cable) can be divided in both the frequency and time domains. This canonical division provides a high flexibility and fine granularity for resource sharing. A basic structure of a multi-carrier signal in the frequency domain is made up of subcarriers, and within a particular spectral band or channel there are a fixed number of subcarriers. There are three types of subcarriers:

1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard-bands and DC carriers.

Figure 1:
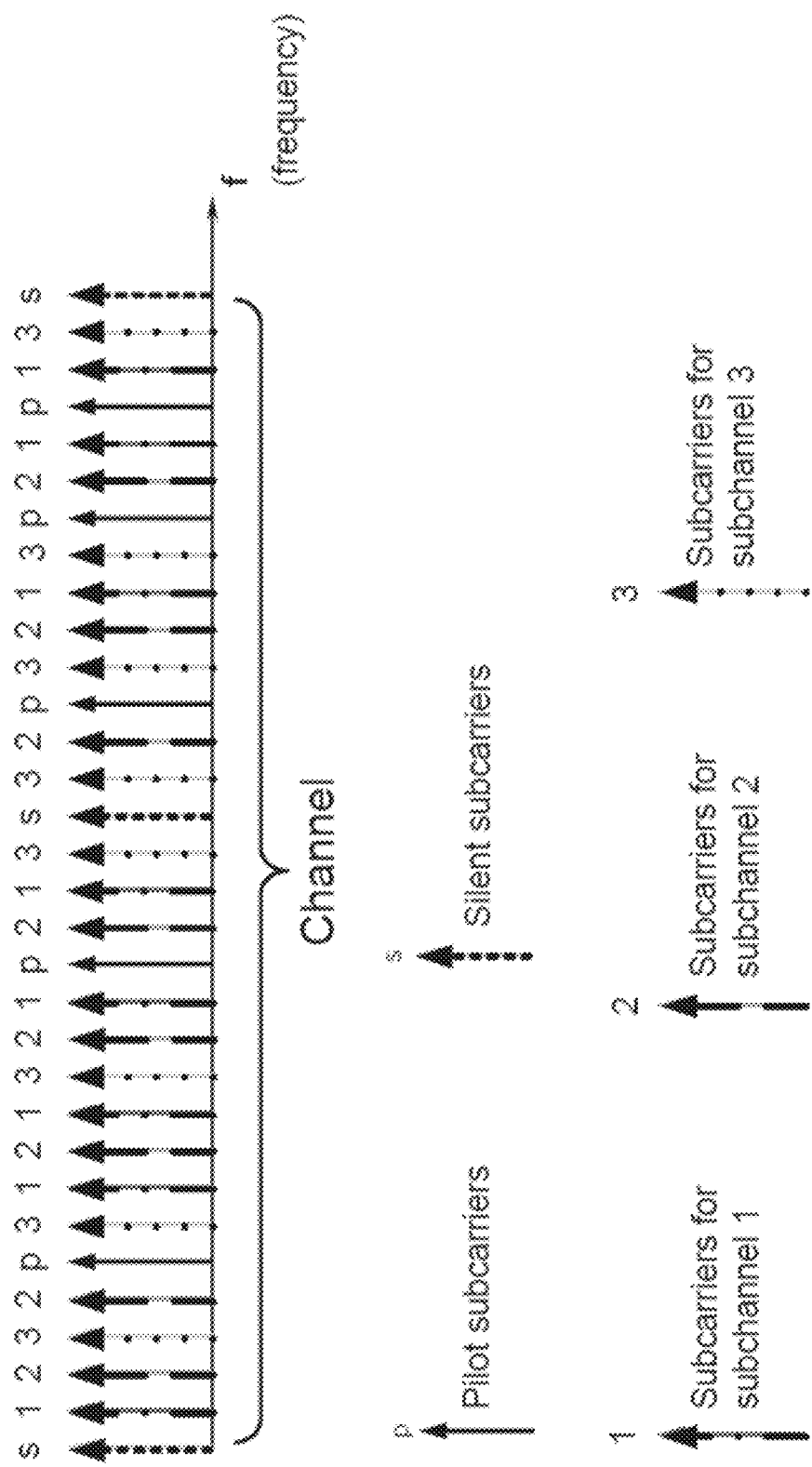
FIG. 1 depicts a basic structure of a multi-carrier signal in the frequency domain, made up of subcarriers.
Figure 2:
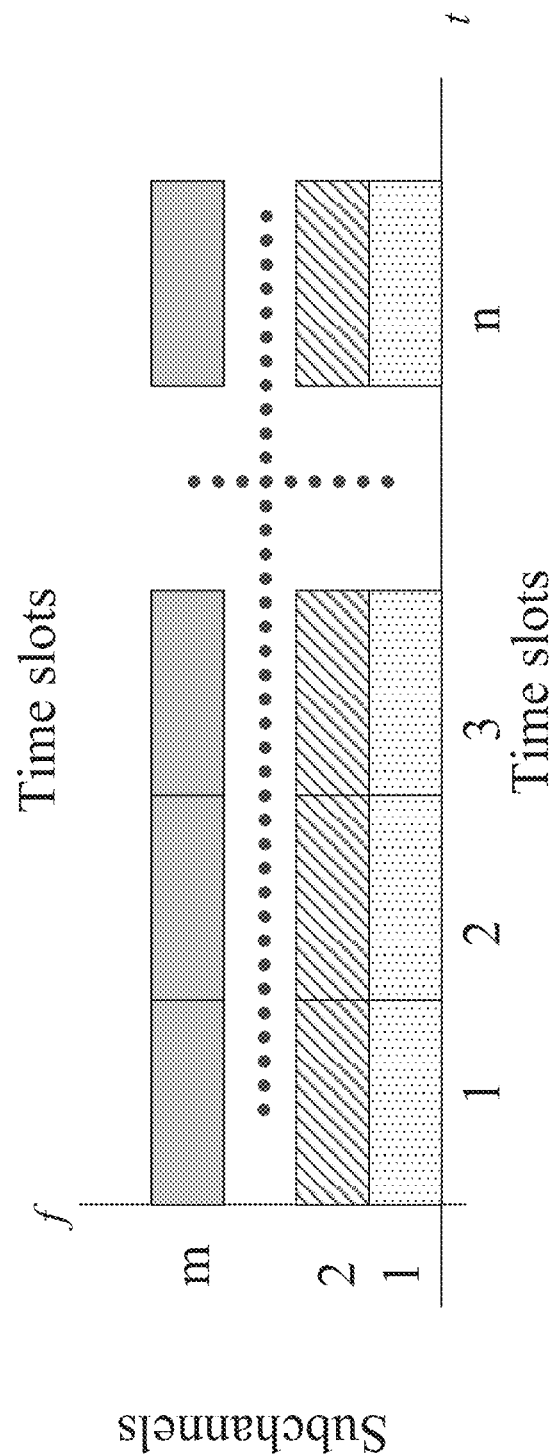
FIG. 2 shows a radio resource divided into small units in both the frequency domain (subchannels) and the time domain (time slots).

The data subcarriers can be arranged into groups called subchannels to support scalability and multiple-access. The carriers forming one subchannel are not necessarily adjacent to each other. Each user may use part or all of the subchannels. The concept is illustrated in FIG. 1 for the interleaved subchannels at the base station transmitter. Data subcarriers can be grouped into subchannels in a particular way and the pilot subcarriers are also distributed over the entire channel in a particular way. The basic structure of a multi-carrier signal in the time domain is made up of time slots to support multiple-access. The resource division in both the frequency and time domains is depicted in FIG. 2.

Figure 3:
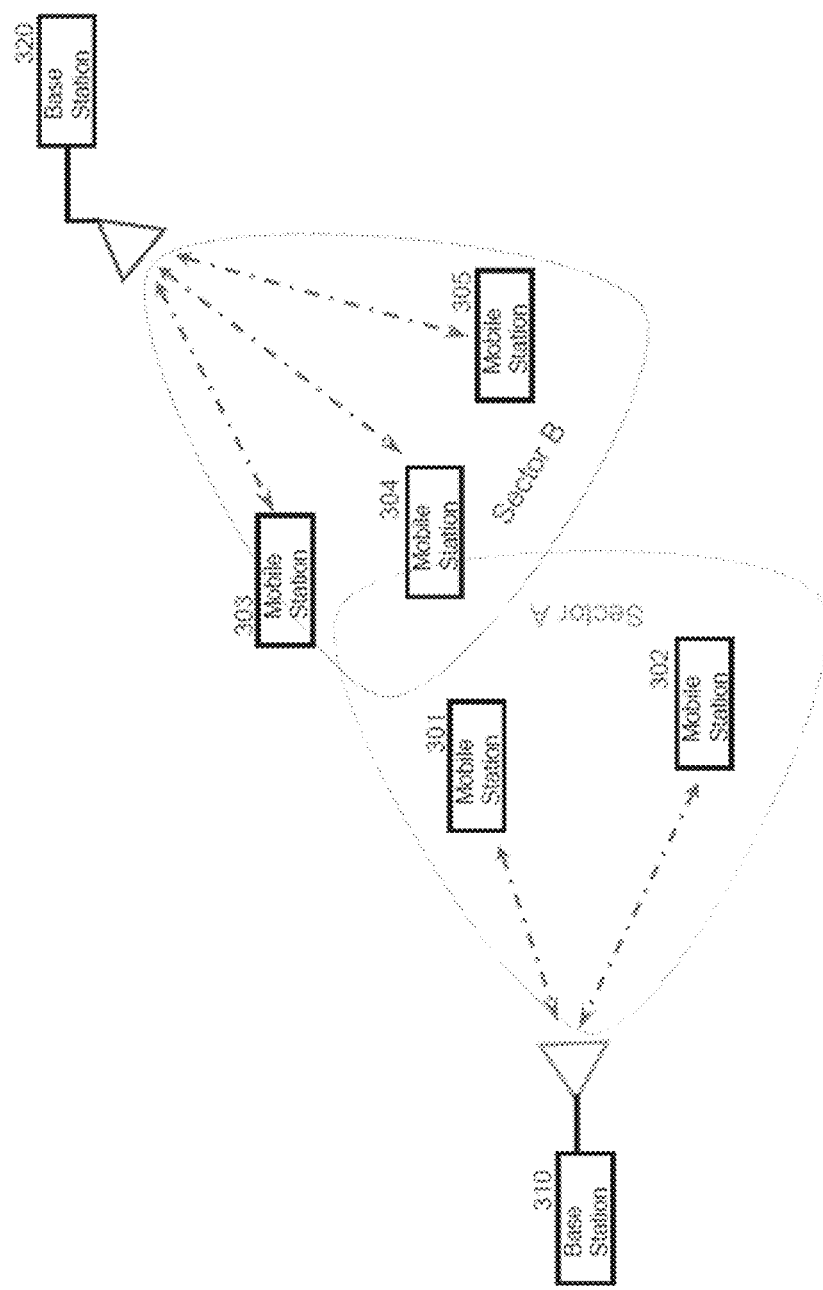
FIG. 3 shows a cellular system with at least one cell and one base station.

FIG. 3 illustrates a typical cellular structure. In this illustration no distinction is made between a cell and a sector. If a cell is divided into sectors, from a system engineering point of view each sector can be considered a cell. In this context, the terms "cell" and "sector" are interchangeable. Both of them are generally called a cell. In the communication system of FIG. 3 Base Station 310 is communicating with Mobile Stations 301 and 302 in Sector A of its cell site while Base Station 320 is communicating with Mobile Stations 303, 304, and 305 in Sector B of its cell site.

Figure 4:
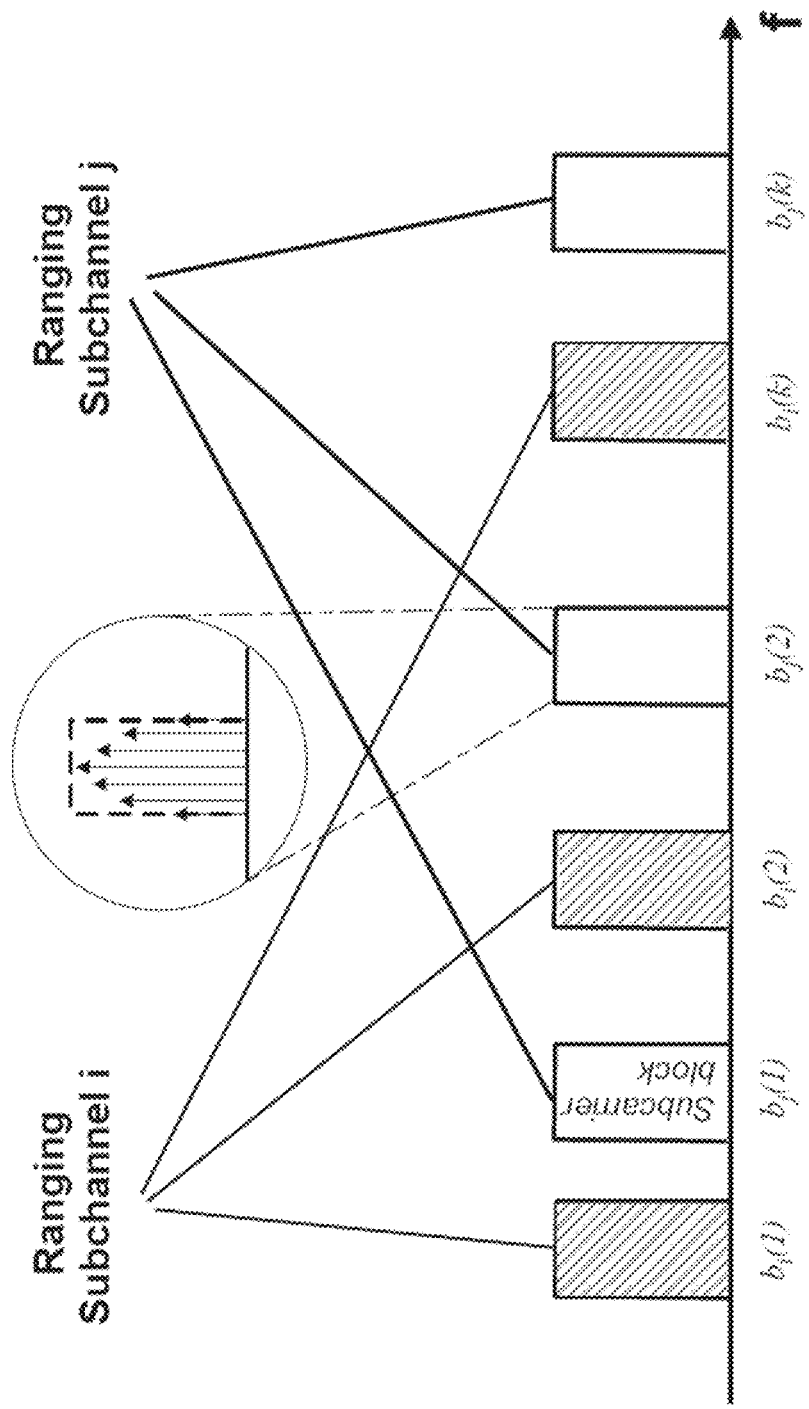
FIG. 4 depicts a ranging subchannel composed of at least one block of subcarriers.

FIG. 4 illustrates two ranging subchannels, each of which is composed of multiple blocks of subcarriers. The subcarriers in each block are contiguous in frequency. FIG. 4 schematically shows that the signal power of the subcarriers towards the boundary (the lower ends and the higher ends in frequency) of a block is lower than that of the subcarriers towards the center of the block. (In a special case, the power levels of the two subcarriers at both ends of a block are set to zero.) Because different factors may cause possible overlap of two subcarrier blocks from to different transmitters, the attenuated boundary subcarriers will minimize the resulting interference.

In accordance with aspects of some embodiments, the ranging signal is carried over a ranging subchannel that contains multiple subcarriers. Either binary or non-binary signals can be modulated on the subcarriers of a ranging subchannel.

The sequence of modulating signals in a ranging subchannel is called a ranging sequence. Multiple ranging sequences are permitted in a cell. A mobile station chooses a ranging sequence for random access and uses the sequence to identify itself in the initial communication with a base station. The period of a ranging signal is called a ranging slot. A ranging slot may last over one or multiple OFDM symbols. Multiple ranging slots can be provided to increase the random access opportunity and reduce the collision probability.

In one embodiment, different cells may have different subcarrier configurations for their ranging subchannels. Different cells may also have different ranging sequence sets. These differences may be used to identify the association of a mobile station with a cell.

Figure 5:
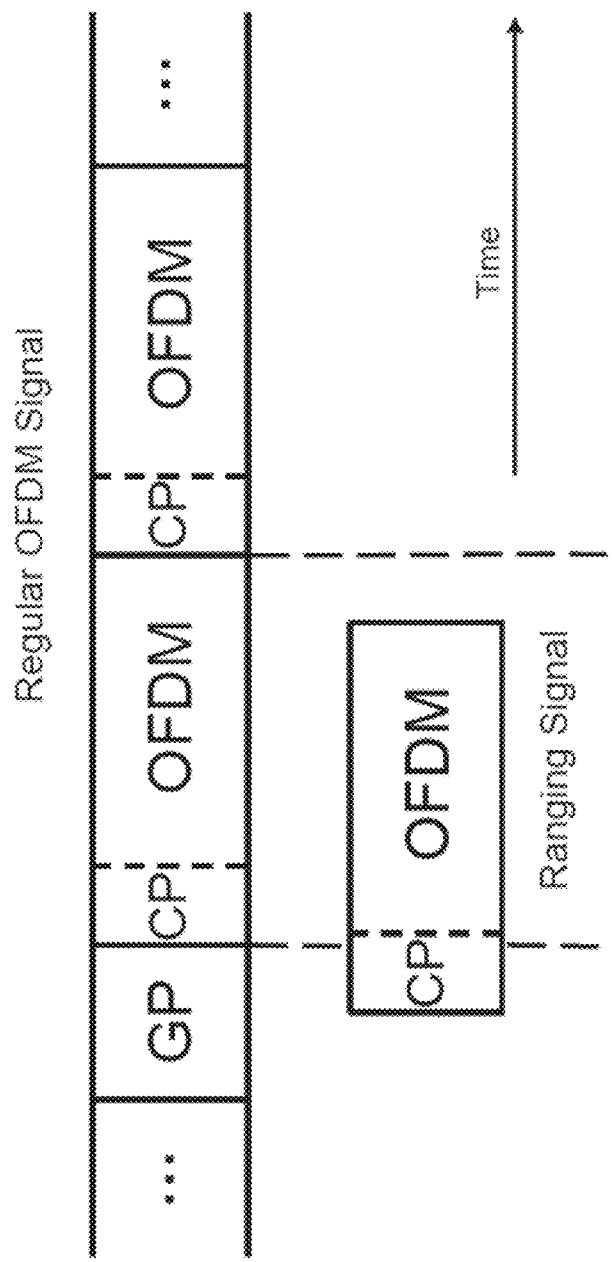
FIG. 5 illustrates a case of time misalignment in a ranging signal, with a base station OFDM time frame, due to uncertainty of a mobile station's round trip delay at an initial stage of random access.
Figure 6:
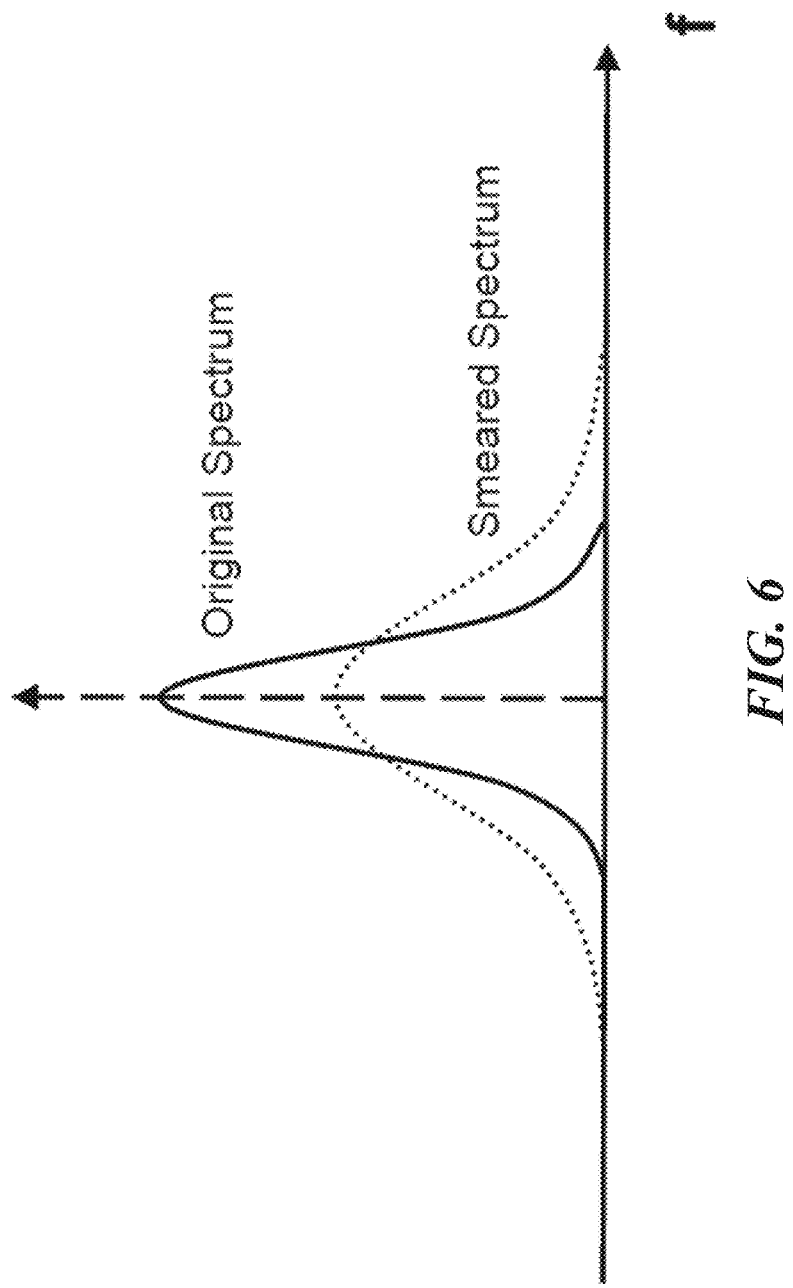
FIG. 6 depicts a smeared spectrum of a subcarrier in a ranging subchannel when the ranging signal is received using a regular OFDM time frame.

FIG. 5 illustrates the timing of regular uplink data signals and ranging signals (with a Guard Period G.P.). In the beginning of a random access attempt, the mobile station is unaware of its round-trip time to the base station. As a result, the arrival time of ranging signal at the base station may be misaligned with other signals which have been synchronized to the base station clock. As depicted in FIG. 5, the random access Ranging Signal does not coincide with the expected arrival time at the base station. As shown in FIG. 6, time misalignment of regular signals and ranging signals can cause spectrum of ranging signals to be smeared when it is received using the OFDM time window of regular signals. Therefore, misaligned subcarriers within a ranging subchannel will interfere with each other and with other data subchannels that are adjacent to them. In the following description, several methods are presented to address such problems.

In one embodiment, the ranging subchannel is composed of multiple blocks of subcarriers. The subcarriers in each block are contiguous in frequency. The signal power of the subcarriers towards the boundary (the lower ends and the higher ends in frequency) of a block is lower than that of the subcarriers towards the center of the block. In a special case, the power levels of the two subcarriers at both ends of a block are set to zero.

In yet another embodiment, each segment of a ranging sequence is a Hadamard sequence and a full ranging sequence is composed of multiple Hadamard sequences. Each segment corresponds to a block of contiguous subcarriers. In Table 1, a typical example is shown for two ranging sequences. Each segment is a 4-bit Hadamard sequence and each ranging sequence is composed of 4 segments. The two ranging sequences are segment-wise orthogonal to each other.

TABLE 1

Example of ranging sequences

| | | | | |
|---|---|---|---|---|
| Ranging Sequence 1 | +1 −+1 −1 | +1 +1 +1 +1 | +1 +1 −1 −1 | +1 −1 −1 +1 |
| Ranging Sequence 2 | +1 +1 +1 +1 | +1 −1 −1 +1 | +1 −1 +1 −1 | +1 +1 −1 −1 |

Figure 7:
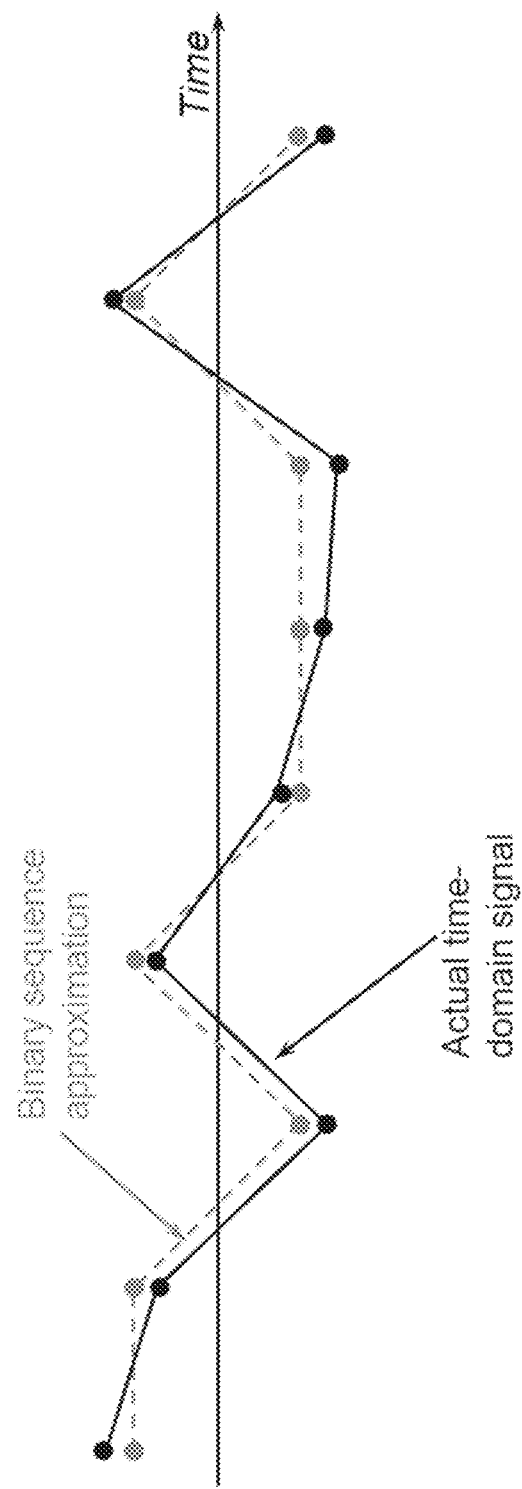
FIG. 7 illustrates a ranging sequence's corresponding time-domain signal that can be approximated with a binary sequence.

In addition, other properties in signal processing can be exploited in sequence design. In one embodiment of the implementation, the ranging sequence is designed such that its corresponding time-domain signal exhibits relatively low peak-to-average power ratio. This improves the power efficiency of the mobile station transmission power amplifier. Furthermore, the ranging signal is designed such that the time signal can be approximated with a binary sequence (e.g., FIG. 7), thereby reducing the complexity of the receiver correlator. While in theory, and even in practice, each modulating digit of a ranging sequence can represent a range of logic levels, a binary format is practically the simplest representation and requires the simplest receiver components for its processing. FIG. 7 illustrates a ranging sequence's corresponding time-domain signal that can be approximated with a binary sequence.

In another embodiment, the blocks of a ranging subchannel can be distributed or allocated in such a way that the autocorrelation of a ranging sequence corresponding to the ranging subchannel, in time-domain, exhibits a set of desired properties such as a narrow main peak and low sidelobes. For example, the blocks can be distributed in the frequency band of interest such that there is minimum redundancy in a co-sampling function. In other words, spacing between the blocks of a ranging subchannel in the frequency domain has no or minimum repetition, as illustrated in FIG. 8, where the spacing consists of the set {d, 2d, 3d, 4d, 5d, 6d}.

Figure 8:
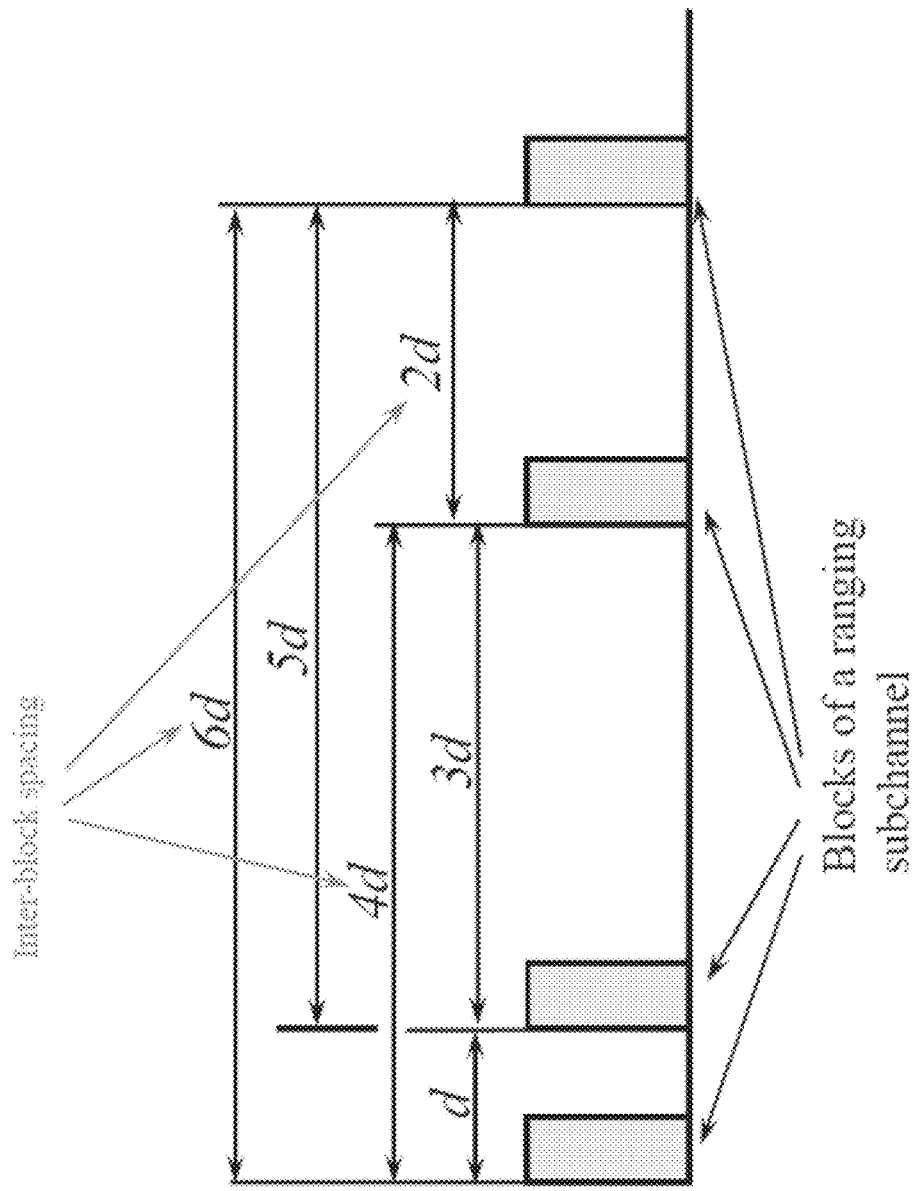
FIG. 8 shows a ranging subchannel arrangement in which spacing between subcarrier blocks in the frequency domain has no, or minimum, repetition.

FIG. 8 is merely an example of such possible arrangements, where an autocorrelation process only produces one major peak, regardless of the ranging sequence carried by the ranging subchannel blocks. During an autocorrelation process, two copies of a ranging signal move in parallel with respect to each other, in a step-wise manner, and at each step the sum of the multiplication of their corresponding values is computed and recorded. Note that in an interval of a ranging subchannel where there are no subcarriers, the ranging signal value is zero. Therefore, employing the proposed arrangements, at any step except for the step during which the two copies of the ranging signal are substantially aligned, most of the non-zero values of either copy will correspond to the zero values of the other copy and the multiplication result of the corresponding values will be zero, which results in low sidelobe values.

With regard to controlling the power settings of a ranging signal, before a random access, a mobile station estimates the path loss from a base station, using the received downlink signal. It uses open-loop power control to set the power level of the ranging signal. In one embodiment, the mobile station adds a negative offset to the open-loop power setting and gradually ramps up the transmission power of the ranging signal as the number of random access failures and retrials increase.

In one embodiment, the base station receiver detects the presence of each ranging signal, its time delay, and its power level through the use of a matched filter, a correlator, or other means in the time domain, the frequency domain, or both.

In another embodiment, when the ranging subchannel is composed of blocks of contiguous subcarriers, the base station performs hierarchical detection: first in frequency domain, then in time domain. The detection process is as follows:

1. The FFT is applied to a selected window of the received time-domain signal, s(t).
2. For a particular ranging subchannel, its received version, $\{\vec{r}(k)\}_{k=1}^{K}$, is correlated in the frequency domain with the ranging sequences associated with the cell, in a segment-wise fashion, where K is the total number of blocks in a ranging subchannel. If the $m^{th}$ sequence associated with the cell is denoted by $\{\vec{b}_m(k)\}_{k=1}^{K}$, the correlation value, $P_m$, is computed by:

$$P_m = \sum_{k=1}^{K} |\langle \vec{r}(k) \cdot \vec{b}_m(k) \rangle|^2,$$

where the dot-product is computed by:

$$\langle \vec{r}(k) \cdot \vec{b}_m(k) \rangle = \sum_{n=1}^{N} x(k,n) \cdot [c_m(k,n)]^*$$

and where N denotes the number of subcarriers in a block, x(k,n) denotes the received version of the $n^{th}$ subcarrier of the $k^{th}$ block in the given ranging subchannel, and $c_m(k,n)$ represents the value of the $n^{th}$ subcarrier of the $k^{th}$ block in the given ranging subchannel for the $m^{th}$ sequence. It is noted that that both $\vec{r}(k)$ and $\vec{b}_m(k)$ are vectors of the dimension same as the segment length. If $P_m$ is greater than a given threshold, this indicates that a ranging signal corresponding to the $m^{th}$ sequence has been detected.

3. For the ranging signal identified in Step 2, a time-domain correlation of the full sequence of the ranging signal is performed, in a sliding-window fashion, to find the time delay of that ranging signal, that is:

$$C(\tau) = \left| \sum_{t=0}^{T} s(t+\tau) \cdot z^*(t) \right| \text{ for } \tau = 0, 1, \ldots, D$$

where T denotes the length of the time-domain ranging sequence, D corresponds to the maximum time delay allowed by the system, and z*(t) represents the time-domain signal of the detected ranging sequence. The maximum value of C(τ) for τ=0, 1, . . . , D is the estimate of the power of the ranging signal and the corresponding value of 7 indicates the time delay associated with the ranging signal.

In the case of ranging sequences composed of Hadamard sequences, the dot-products of the received signal and the ranging sequence in a particular segment in Step 2 can be evaluated simultaneously using a single Fast Hadamard Transform (FHT), thereby simultaneously detecting multiple ranging sequences.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above s and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms.

Accordingly, the inventors reserve the right to add additional claims after filing the application to pursue such additional claim forms for other aspects of the invention.

The invention claimed is:

1. A method, comprising:
transmitting, by a device in an orthogonal frequency division multiple access (OFDMA) cellular system, a ranging signal via a non-contiguous subset of blocks of a ranging subchannel comprising a plurality of contiguous blocks, each block comprising a plurality of consecutive subcarriers,
wherein an inter-block frequency spacing between each pair of blocks of the ranging subchannel is different than the inter-block frequency spacing between each other pair of blocks of the ranging subchannel; and
transmitting, by the device, data over a subchannel comprising at least the plurality of contiguous blocks of the ranging subchannel.

2. The method of claim 1, wherein each block of the non-contiguous subset of blocks comprises a plurality of subcarriers, and wherein transmitting the ranging signal further comprises transmitting, in at least one block of the non-contiguous subset of blocks, a signal having a lower power on a lowest subcarrier of the block than a power of a next lowest subcarrier of the block.

3. The method of claim 2, wherein transmitting the ranging signal further comprises transmitting, in the at least one block, a signal having a lower power on a highest subcarrier of the block than a power of a next highest subcarrier of the block.

4. The method of claim 2, wherein, in the at least one block, the power of the lowest subcarrier of the block is zero.

5. The method of claim 4, wherein, in the at least one block, the lowest subcarrier of the block is silent.

6. The method of claim 1, wherein transmitting the ranging signal further comprises transmitting a sequence of orthogonal frequency division multiplexing (OFDM) symbols.

7. The method of claim 6, wherein the sequence of OFDM symbols comprises a plurality of segments of OFDM symbols.

8. The method of claim 7, wherein each segment of the sequence of OFDM symbols is different from each other segment of the sequence.

9. The method of claim 7, wherein each segment of the sequence is OFDM symbols is orthogonal to a corresponding segment of a transmitted second ranging signal of the OFDMA cellular system.

10. The method of claim 9, further comprising transmitting, by the device, the ranging signal while the second ranging signal is transmitted.

11. A device in an orthogonal frequency division multiple access (OFDMA) cellular system, comprising:
a transmitter, configured to transmit a ranging signal via a non-contiguous subset of blocks of a ranging subchannel comprising a plurality of contiguous blocks, each block comprising a plurality of consecutive subcarriers,
wherein an inter-block frequency spacing between each pair of blocks of the ranging subchannel is different than the inter-block frequency spacing between each other pair of blocks of the ranging subchannel; and
wherein the transmitter is further configured to transmit data over a subchannel comprising at least the plurality of contiguous blocks of the ranging subchannel.

12. The device of claim 11, wherein each block of the non-contiguous subset of blocks comprises a plurality of subcarriers, and wherein the transmitter is further configured to transmit, in at least one block of the non-contiguous subset of blocks, a signal having a lower power on a lowest subcarrier of the block than a power of a next lowest subcarrier of the block.

13. The device of claim 12, wherein the transmitter is further configured to transmit, in the at least one block, a signal having a lower power on a highest subcarrier of the block than a power of a next highest subcarrier of the block.

14. The device of claim 12, wherein, in the at least one block, the power of the lowest subcarrier of the block is zero.

15. The device of claim 14, wherein, in the at least one block, the lowest subcarrier of the block is silent.

16. The device of claim 11, the transmitter is further configured to transmit a sequence of orthogonal frequency division multiplexing (OFDM) symbols.

17. The device of claim 16, wherein the sequence of OFDM symbols comprises a plurality of segments of OFDM symbols.

18. The device of claim 17, wherein each segment of the sequence of OFDM symbols is different from each other segment of the sequence.

19. The device of claim 17, wherein each segment of the sequence is OFDM symbols is orthogonal to a corresponding segment of a transmitted second ranging signal of the OFDMA cellular system.

20. The device of claim 19, wherein the transmitter is further configured to transmit the ranging signal while the second ranging signal is transmitted.

* * * * *